United States Patent [19]
Lee, Jr.

[11] 4,087,112
[45] May 2, 1978

[54] TRAILER COUPLER

[76] Inventor: Lindell E. Lee, Jr., P.O. Box 402, Idalou, Tex. 79329

[21] Appl. No.: 765,617

[22] Filed: Feb. 4, 1977

[51] Int. Cl.² .............................................. B60D 1/02
[52] U.S. Cl. .................................. 280/515; 85/5 CP; 213/188
[58] Field of Search ............... 280/515; 85/5 CP, 5 E, 85/5 M, 8.3; 24/201 LP, 234, 241 SP, 241 S; 403/154; 213/194, 86, 98, 188; 292/DIG. 49

[56] References Cited
U.S. PATENT DOCUMENTS

| | | | |
|---|---|---|---|
| 2,367,874 | 1/1945 | Kelley | 85/5 CP |
| 3,011,801 | 12/1965 | Neumann | 85/5 CP |

FOREIGN PATENT DOCUMENTS

| | | | |
|---|---|---|---|
| 532,113 | 8/1931 | Germany | 280/515 |

*Primary Examiner*—John A. Pekar
*Attorney, Agent, or Firm*—Wendell Coffee

[57] ABSTRACT

A C-shaped retaining handle is connected to a draft pin and has a cam on an end near the point of connection. A springed washer presses against the cam, thereby securing the handle to lock the draft pin in place, yet permitting the handle to be raised for uncoupling.

6 Claims, 4 Drawing Figures

TRAILER COUPLER

BACKGROUND OF THE INVENTION (1) Field of the Invention

This invention relates to couplings for articulated wheeled land vehicles, and more particularly to draft pins for such couplings.

(2) Description of the Prior Art

Draft pins are commonly used to couple a towing vehicle hitch and a towed vehicle tongue with holes therein. However, a recurring problem is how to prevent friction and vibration from working the pin up out of the holes, resulting in the disconnection of the towing and towed vehicles with possibly disastrous results.

Previously, one solution to this problem was loosely attaching a C-shaped member to a draft pin, the lower end of which swung by gravity below the hitch members and prevented the draft pin from rising above the lower end of the C-shaped member.

Other workers in the art did not desire to rely upon gravity to maintain the C-shaped member in a proper position. Therefore, these other workers developed means for locking the retaining member in place.

Many of the trailer couplers of the prior art required the use of two hands to lock and unlock them, and often involved intricate, delicate mechanisms for ther performance. In addition, many such devices did not provide a means for holding the retaining handle in an unlocked position.

NEUMANN, U.S. Pat. No. 3,011,801, uses an eyelet formed in the lower end of the C-shaped retaining member which slides over the end of the draft pin and is kept in a position above the lower end of the draft pin by spring means at the top of the draft pin and retaining member.

JEZEK, U.S. Pat. No. 3,196,239, keeps the C-shaped retaining member in position in a similar way, but in addition provides a plate which prevents the retaining member from being pushed down unless the other side of the plate is depressed also.

KELLOG ET AL, U.S. Pat. No. 2,547,326, uses an engaging pin connected to the C-shaped retaining member to positively engage a hole in a pivoting draft pin to keep the retaining member in position relative to the draft pin. The C-shaped retaining member is unlocked by pulling the engaging pin from the hole in the draft pin.

The following patents were known to me at the time of filing this application:

Backman — 2,786,383
Bible — 2,454,856
Kelley — 2,367,874
Rebaylio — 2,303,260
Peterson — 2,224,522
Stastny — 2,180,558
Davidson — 2,007,825

SUMMARY OF THE INVENTION (1) New and Different Function

I have invented an improved trailer coupler that eliminates many of the disadvantages of previous devices and at the same time admirably accomplishes the desired result of retaining the draft pin within the holes in the towing vehicle hitch and towed vehicle tongue.

My invention may be locked and unlocked with a single motion of one hand from a stationary unlocked or locked position. While in the unlocked position, the handle provides assistance in inserting or extracting the draft pin. In addition, the mechanism is durable and uncomplicated.

I have accomplished these novel and desirable results by inventing a trailer coupler which incorporates a springed cam mechanism for maintaining the C-shaped retaining handle in either an unlocked or locked position. The retaining handle will not open until a force greater than those forces present during towing, but well within the capability of a normal person, is applied to the handle, thereby eliminating the need for safety catches and the like.

(2) Objects of this Invention

An object of this invention is to provide a better draft pin.

Further objects are to achieve the above with a device that is sturdy, compact, durable, lightweight, simple, safe, efficient, versatile, energy conserving, and reliable, yet inexpensive and easy to manufacture, use and maintain.

Other objects are to achieve the above with a method that is versatile, energy conserving, rapid, efficient, and inexpensive, and does not require skilled people to use and maintain.

The specific nature of the invention, as well as other objects, uses, and advantages thereof, will clearly appear from the following description and from the accompanying drawing, the different views of which are not necessarily to the same scale.

DESCRIPTION OF THE PREFERRED EMBODIMENT

Figure 1:
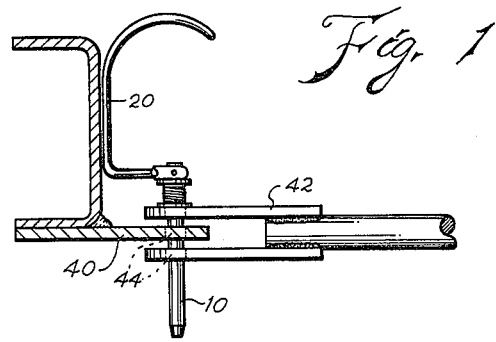
FIG. 1 is a side elevational view of a towing vehicle hitch plate and a towed vehicle bifurcated tongue with a trailer coupler according to an embodiment of this invention therein, with the retaining handle in the open, unlocked position.

Draft pin member 10 is a cylindrical, longitudinal pin having a longitudinal axis, pivot end 12, and distal end 14. The distal end 14 of the draft pin member 10 is beveled for easy insertion into holes. Retaining handle member 20 is a longitudinal pin which is formed in the shape of a letter "C". The retaining handle member 20 has pivot end 22, distal end 24 and straight mid-section 26. The distal end 24 is beveled to eliminate sharp exposed edges.

Figure 3:
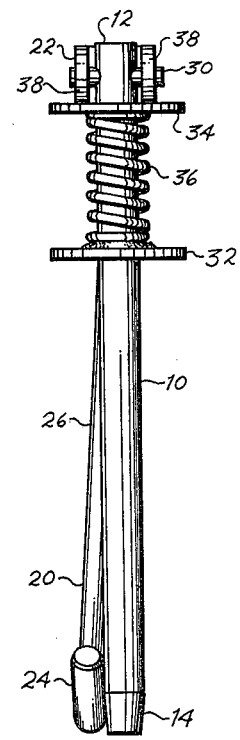
FIG. 3 is a side elevational view thereof rotated approximately 90° from FIG. 2.

By referring to FIG. 3, it may be seen that the retaining handle member 20 is bifurcated on the pivot end 22. The pivot end 12 fits between the ends of the bifurcated pivot end 22, and is connected thereto by hinge pin 30, which serves as a fastener and extends through the pivot ends 12 and 22.

Figure 2:
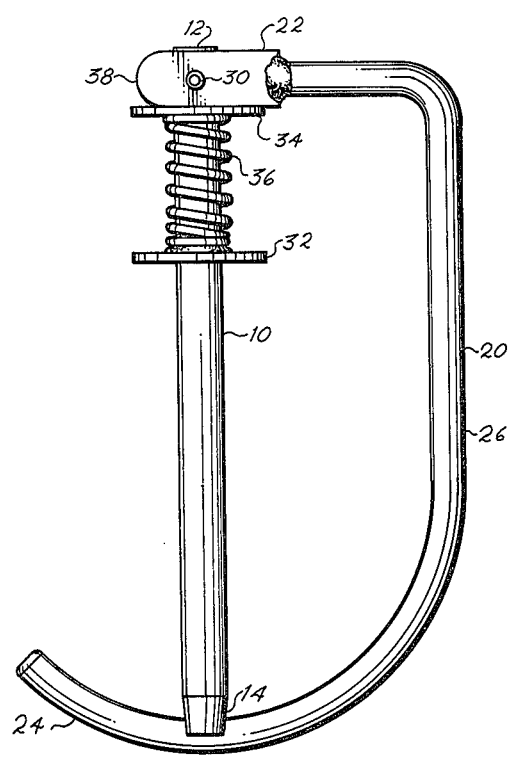
FIG. 2 is a side elevational view of the trailer coupler.

By referring to FIGS. 2 and 3, it may be seen that the retaining handle member 20 is connected to the draft pin member 10 by the hinge pin 30 in such a way that the retaining handle member 20 rotates about the axis of the hinge pin, wherein the longitudinal axis of the hinge pin 30 is perpendicular to the longitudinal axis of the draft pin member 10, thus insuring that the sweep of the arc of the distal end 24 of the retaining handle member 20 will be near as possible to the distal end 12.

Collar 32 is in the form of a washer telescoped over and welded to the draft pin member 10. Cam follower 34 is in the form of a washer slidably telescoped over the draft pin member 10 between the hinge pin 30 and the collar 32. Helical compression spring 36 is telescoped co-axially around the draft pin member 10 between the cam follower 34 and the collar 32.

Figure 4:
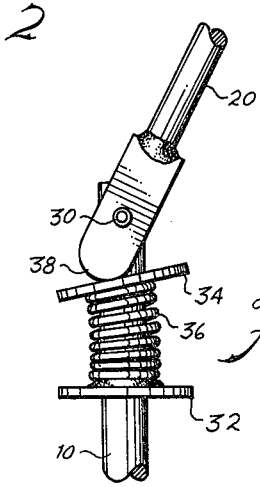
FIG. 4 is a detailed close-up partial view thereof showing the cam mechanism in intermediate position.

By referring to FIG. 2, it may be seen that cam 38 is formed by the ends of the bifurcation of the retaining handle member 20 at the pivot end 22. It may be seen that the cam 38 has two flat parallel sides proximate the hinge pin 30, and a curved end distal of the hinge pin 30. Thus, it may be seen by referring to FIG. 4 that in order for the flat sides of the cam 38 not to be in contact with the cam follower 34 and for the curved end of the cam 38 to be in contact with the cam follower 34, the helical compression spring 36 must be compressed. Therefore, it may easily be seen that because the helical compression spring 36 is most stable at its greatest length, and because that length only occurs when the flat sides of the cam 38 are flush and in contact with the cam follower 34, the retaining handle is maintained in either the position shown in FIG. 2 or the position shown in FIG. 1.

It may be seen that the collar 32 and the helical compression spring 36 form a resilient means for urging the cam follower 34 against the cam 38, and that the collar 32, the helical compression spring 36, the cam follower 34 and the cam 38 form a biasing means for resiliently maintaining the retaining handle member 20 in either a closed position wherein the distal end 24 is proximate the distal end 14 or an open position wherein the distal end 24 is remote from the draft pin member 10.

The placement of the draft pin member within the hitches is illustrated in FIG. 1. Hitch plate 40 is attached to a towing vehicle such as a farm truck (not shown). Bifurcated tongue 42 is attached to a towed vehicle such as a farm trailer (not shown). The hitch plate 40 fits slidably within the bifurcation in the bifurcated tongue 42. The draft pin member 10 extends slidably through vertically aligned holes 44 in the hitch plate 40 and the bifurcated tongue 42.

As may be seen by referring to FIG. 1, the retaining handle member forms a C-shape when in the open position with the distal end 24 remote from the draft pin member 10 and the bifurcated tongue 42 and the hitch plate 40. While in the open position, the retaining handle member 20 serves admirably as a handle for inserting and extracting the draft pin member 10 from the holes 44. As seen in FIG. 2, the retaining handle and draft pin together form a D-shape when in the closed position. In the closed position, the distal end 24 is about the same distance from the longitudinal axis of the draft pin member 10 as is the middle straight section 26. This insures that the area swept by the retaining handle 20 is adequate to assure that the hitch plate 40 or bifurcated tongue 42 will be contacted by the retaining handle 20 before the draft pin member 10 is worked out of the holes 44. In addition, the distance between the straight mid-section 26 and the draft pin member 10 is adequate to clear the hitch plate and bifurcated tongue 42. E.g., the distance between the draft pin member 10 and the straight mid-section 26 is greater than the radial distance from the center of the holes 44 to a side of the hitch 40 or the tongue 42.

As described above, the retaining handle member 20 is resiliently maintained in a stationary position until sufficient work is done on the handle member 20 to compress the spring 36 to allow the retaining handle member to open. Normally, the work required to move the handle to such a position as would allow the pin to work itself out of the holes in hitches will be substantially greater than would be available due to vibration or friction, yet well within the capabilities of a normal person.

Therefore, it may readily be seen that by inventing a trailer coupler incorporating this simple cam mechanism, I have invented a trailer coupler that is simple to use, durable, uncomplicated and accomplishes a total result greater than the sum of the functions of the individual elements.

As an aid to correlating the terms of the claims to the exemplary drawing, the following catalog of elements is provided:

10 draft pin member
12 pivot end (draft pin)
14 distal end (draft pin)
20 retaining handle member
22 pivot end (ret. handle)
24 distal end (ret. handle)
26 mid-section
30 hinge pin
32 collar
34 cam follower
36 compression spring
38 cam
40 hitch plate
42 bifurcated tongue
44 holes The emodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:
1. In a trailer coupler having
   a. a draft pin member having
      (i) a longitudinal axis,
      (ii) a pivot end, and
      (iii) a distal end, and
   b. a C-shaped retaining handle member having
      (i) a pivot end, and
      (ii) a distal end,
   c. a fastener connecting the pivot end of said retaining handle member to the pivot end of said draft pin member,
   d. said fastener providing means for rotating said retaining handle member about an axis at its pivot end perpendicular to the longitudinal axis of said draft pin member;
The improved structure comprising in combination with the above:
   e. one of said members having a cam at its pivot end,
   f. said cam having two flat faces, g. the other of said members having a cam follower at its pivot end,
h. said cam follower contacting said cam, and
j. resilient means operatively interconnecting said other member and said cam follower for biasing said cam follower toward said cam,
k. so that when one flat face of the cam is on said cam follower, the distal end of the members are proximate, and
m. when the other flat face of the cam is on said cam follower, the distal end of the retaining handle member is remote from said draft pin member,
n. said cam follower is a washer coaxially around the draft pin member near the pivot end, and
o. said resilient means is a helical compression spring around said draft pin member between a collar thereon and said washer.

2. The invention as defined in claim 1 wherein
p. said fastener is a hinge pin,
q. said hinge pin extending through the pivot ends of said members.

3. The invention as defined in claim 2 with additional limitations of
r. a bifurcation on the pivot end of the retaining handle member,
s. the end of said bifurcation forming said cam.

4. The invention as defined in claim 3 with additional limitations of
t. a horizontally oriented towing vehicle hitch plate,
u. a towed vehicle bifurcated tongue,
v. said hitch plate fitting slidably between the bifurcations of said tongue,
w. vertically aligned holes within said hitch plate and bifurcated tongue, wherein the axes of said holes are perpendicular to the plane formed by said hitch plate,
x. said draft pin extending slidably through said holes.

5. In a trailer coupler having
a. a draft pin member having
 (i) a longitudinal axis,
 (ii) a pivot end, and
 (iii) a distal end, and
b. a C-shaped retaining handle member having
 (i) a pivot end, and
 (ii) a distal end,
c. a fastener connecting the pivot end of the retaining handle member to the pivot end of said draft pin member,
d. said fastener providing means for rotating said retaining handle member about an axis at its pivot end perpendicular to the longitudinal axis of said draft pin member, The improved structure comprising in combination with the above:
e. the pivot end of one of said members being bifurcated,
f. the pivot end of the other member being between the bifurcations and connected to said member with said fastener,
g. each of said bifurcations having a cam thereon,
h. said cams having two flat parallel faces separated by a curved face,
j. the other of said members having a cam follower around it proximate its pivot end,
k. resilient means operatively interconnecting said other member and said cam follower,
m. the distal ends of said members being proximate when one flat face of the cam is against said cam follower, and
n. the distal ends of said members being remote from one another when the other flat face of said cam is against said cam follower.

6. The invention as defined in claim 5 further comprising:
o. said bifurcations being at the pivot end of said retaining handle member, and
p. said cam follower being a washer around said draft pin member.

* * * * *